United States Patent
Woolmer et al.

(10) Patent No.: US 10,224,786 B2
(45) Date of Patent: Mar. 5, 2019

(54) COOLING OF AXIAL FLUX MOTORS—CENTRIFUGAL

(71) Applicant: Yasa Motors Limited, Abingdon, Oxfordshire (GB)

(72) Inventors: Tim Woolmer, Wheatley (GB); Chris McCaw, Abingdon (GB)

(73) Assignee: YASA LIMITED, Yarnton, Oxfordshire (GB)

( * ) Notice: Subject to any disclaimer, the term of this patent is extended or adjusted under 35 U.S.C. 154(b) by 322 days.

(21) Appl. No.: 14/910,849

(22) PCT Filed: Aug. 8, 2014

(86) PCT No.: PCT/GB2014/052433
§ 371 (c)(1),
(2) Date: Feb. 8, 2016

(87) PCT Pub. No.: WO2015/019107
PCT Pub. Date: Feb. 12, 2015

(65) Prior Publication Data
US 2016/0204678 A1    Jul. 14, 2016

(30) Foreign Application Priority Data

Aug. 8, 2013  (GB) .................................. 1314229.4
Feb. 21, 2014  (EP) .................................... 14156176

(51) Int. Cl.
*H02K 9/19*    (2006.01)
*H02K 5/20*    (2006.01)
(Continued)

(52) U.S. Cl.
CPC ................ *H02K 9/19* (2013.01); *H02K 1/32* (2013.01); *H02K 5/20* (2013.01); *H02K 21/24* (2013.01)

(58) Field of Classification Search
CPC .................................... H02K 9/19; H02K 5/20
See application file for complete search history.

(56) References Cited

U.S. PATENT DOCUMENTS 3,922,574 A * 11/1975 Whiteley ................. H02K 3/46
310/156.32
3,999,092 A * 12/1976 Whiteley ................. H02K 3/46
310/114
(Continued)

FOREIGN PATENT DOCUMENTS

GB    2469562    10/2010
JP    H10 243617    9/1998
(Continued)

OTHER PUBLICATIONS

International Search Report and Written Opinion issued in corresponding application PCT/GB2014/052433, dated Apr. 30, 2015.

*Primary Examiner* — Dang Le
(74) *Attorney, Agent, or Firm* — Meunier Carlin & Curfman LLC

(57) ABSTRACT

The present invention provides an axial flux motor (10) having: a rotor (20) having a radially extending portion (20*r*) and an axially extending portion (20*c*) having a first side (20*a*) and a second side (20*b*); a stator (22) having an inner aperture (30), a front wall (34) having a first side (34*s*) and a second side (34*i*) and being axially spaced from the first side (20*a*) of the rotor (20) by a gap (38), a bearing member (32) within the inner aperture (30) of the stator (22) and supporting the axially extending portion (20*c*) of the rotor (20); a casing (40) having an axially and circumferentially extending outer portion (48) surrounding said rotor (20) and having an inner surface (43); a cover plate (42) having an inner face (42*i*) confronting and being spaced from said second side (20*b*) of said rotor (20); a containment chamber (26) including said second side (34*i*), and said inner face (Continued)

(42*i*) of said cover plate (42) and having a top portion (45); a sump (50) within the containment chamber (26); and one or more first flow diverters (60) on the inner surface (43) of casing (40) to direct liquid towards said first and/or second inner side faces (34*i*, 42*i*).

14 Claims, 7 Drawing Sheets

(51) Int. Cl.
 *H02K 1/32* (2006.01)
 *H02K 21/24* (2006.01)

(56) References Cited

U.S. PATENT DOCUMENTS

| | | | | |
|---|---|---|---|---|
| 4,082,971 | A * | 4/1978 | Miyake | H02K 9/22 |
| | | | | 310/114 |
| 4,408,966 | A * | 10/1983 | Maruyama | F02M 37/06 |
| | | | | 310/268 |
| 4,958,098 | A * | 9/1990 | Sarraf | G02B 26/121 |
| | | | | 310/156.32 |
| 7,109,631 | B2 * | 9/2006 | Tsai | G11B 19/2009 |
| | | | | 310/268 |
| 8,179,016 | B2 * | 5/2012 | Asano | F04C 23/008 |
| | | | | 310/156.32 |

FOREIGN PATENT DOCUMENTS

| | | |
|---|---|---|
| JP | 2005318782 | 11/2005 |
| JP | 2011130531 | 6/2011 |
| WO | 2010092400 | 8/2010 |

* cited by examiner

Figure 4
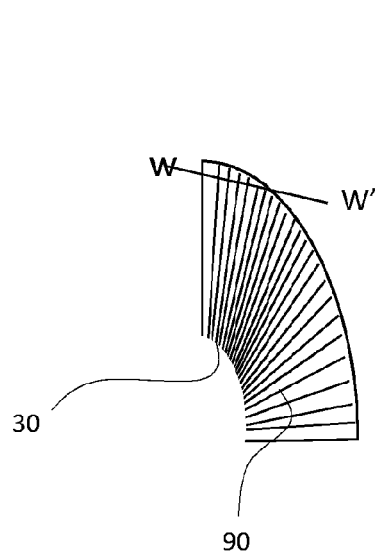
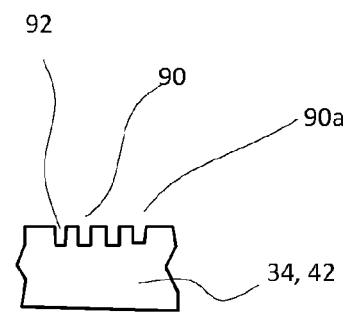
Figure 5
Figure 6
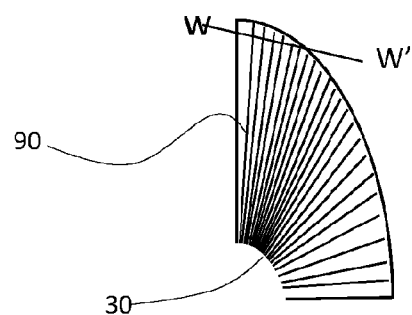
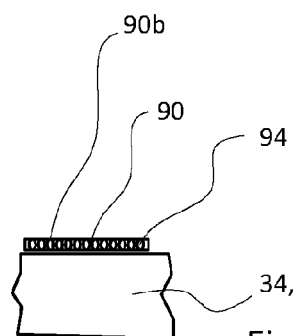
Figure 7

COOLING OF AXIAL FLUX MOTORS—CENTRIFUGAL

This application is a national phase application of PCT Application No. PCT/GB2014/052433, filed Aug. 8, 2014, which claims the benefit of priority to EP patent application 14156176.1, filed Feb. 21, 2014 and GB patent application 1314229.4 filed Aug. 8, 2013.

The present invention relates to electric machines and relates particularly but not exclusively to electric motors or generators of the kind known generally as axial flux motors or generators and relates particularly but not exclusively to the cooling of the rotors provided therein.

GB 2468018A discloses a machine comprising a series of coils wound around pole pieces spaced circumferentially around the stator and disposed axially, (i.e. parallel the rotation axis of the rotor). The rotor has two stages comprising discs provided with permanent magnets that face either end of each electromagnetic coil of the stator. The rotor stages typically comprise a hub region and an annular ring, in which the annular ring is of soft magnetic material and used to convey magnetic flux between adjacent magnets. The magnets are generally surface mounted and spaced circumferentially around the rotor stage annular ring and disposed axially, (i.e. parallel the rotation axis of the rotor). Also known are double and single stator, single rotor axial flux motors wherein said single rotor contains magnets disposed circumferentially with pole faces, facing across air gaps to stator electromagnetic coils similarly disposed. In each of these arrangements the rotor is enclosed within a casing and rotates at high speed therein.

The above machines are driven by supplying electricity to the coils such as to generate a magnetic force therein which is used to react against the magnetic forces present in the permanent magnets on the rotor such as to drive the rotor and, thus, produce the desired rotational output. A significant amount of heat is generated during the operation of the machine and some of this is adsorbed and/or generated by the rotating disk. In some instances the rotor operates in a closed environment and is difficult to cool adequately with conventional techniques as it is difficult to pass the heat from the rotor back across the air gap to cooling systems which are generally provided on the outer side of the casing in which the rotor operates.

In view of the above, it will be appreciated that the operational envelope of the machine is limited by the efficiency of the cooling arrangement employed and the problems associated with cooling the rotor have a significant impact on the ability of any cooling system to adequately cool the machine and allow it to operate in an efficient manner.

The present invention aims to provide an improved cooling system for an axial flux machine and aims in particular to provide an improved arrangement for cooling the rotor within the machine.

According to a first aspect of the present invention there is provided an axial flux motor having: a rotor having a radially extending portion and an axially extending portion having a first side and a second side; a stator having an inner aperture, a front wall having a first side and a second side and being axially spaced from the first side of the rotor by a gap, a bearing member within the inner aperture of the stator and supporting the axially extending portion of the rotor; a casing having an axially and circumferentially extending outer portion surrounding said rotor and having an inner surface; a cover plate having an inner face confronting and being spaced from said second side of said rotor; a containment chamber including said second side, and said inner face of said cover plate and having a top portion; a sump within the containment chamber; one or more first flow diverters on the inner surface of casing, to direct liquid towards said first and/or second inner side faces.

Preferably, said one or more first flow diverters comprise axially extending portions extending towards one or other of inner side faces.

Advantageously, the arrangement includes a plurality of flow diverters and wherein said diverters are circumferentially spaced around said inner surface.

Preferably, the arrangement includes a flow splitter radially outward of said rotor for splitting fluid flow between directions L&R.

Advantageously, the arrangement includes one or more flow interrupters circumferentially spaced around said inner surface which may restrict circumferential flow of liquid and for directing liquid to said one or more flow diverters.

Preferably, the arrangement also includes a flow director on one or other of inner side faces, which may be used for directing fluid to said bearing.

Advantageously, said flow director comprises a plurality of grooves within the surface of one or other or both of said inner side faces.

Preferably, said flow director comprises a wicking material.

Advantageously, said flow director extends radially inwardly towards said bearing member.

In a particularly advantageous arrangement there is provided a second flow diverter extending axially from said cover plate inner face and towards said bearing member.

In one arrangement said rotor includes a hollow shaft portion and wherein said second flow diverter extends into said hollow shaft portion and terminates proximal to said bearing member.

Preferably, the axially extending portion of rotor includes an inner surface and an outer surface and further includes one or more secondary flow directors comprising radially extending passageways extending therebetween, which may be used for receiving and delivering cooling/lubrication fluid to the bearing).

Preferably, said bearing lies between said sump and said top portion of the containment chamber, so as to be in the flow-path of the returning fluid.

The present invention will now be more particularly described by way of example only with reference to the following drawings, in which:

FIG. 4 is a diagrammatic representation of a portion of the sidewall of FIG. 1;

FIG. 5 is a cross-sectional view of one form of flow diverter that may be applied to the sidewall;

FIG. 6 is a further diagrammatic representation of a portion of the sidewall of FIG. 1;

FIG. 7 is a cross-sectional view of a second form of flow diverter that may be applied to sidewall;

Figure 1:
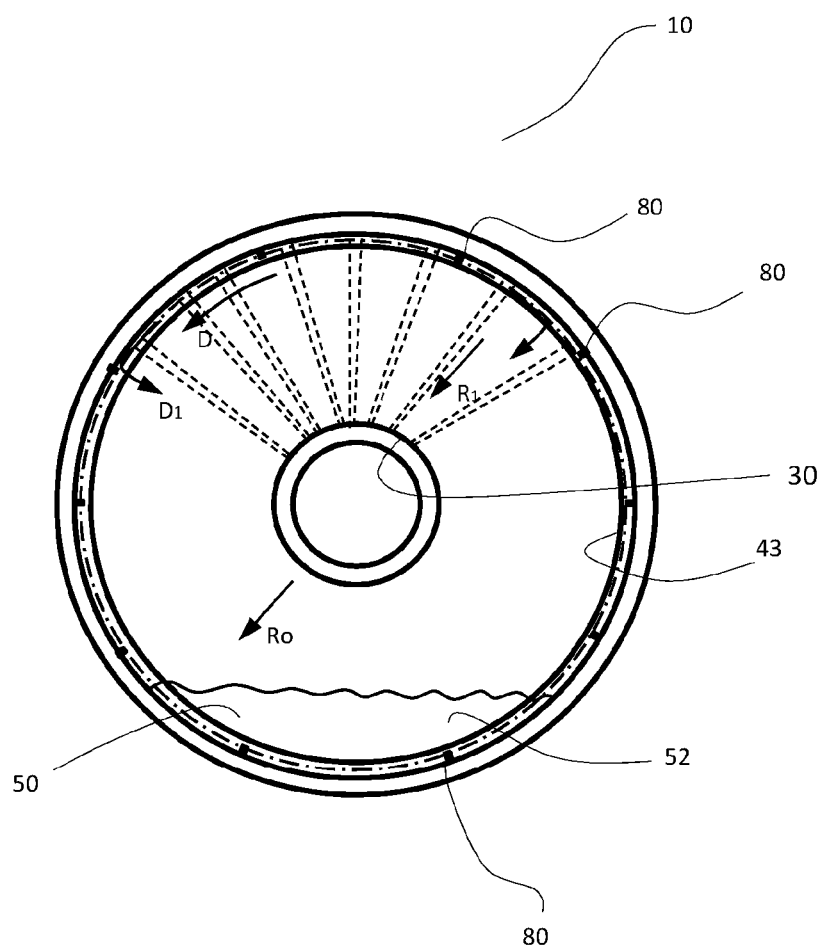
FIG. 1 is a partial cross-sectional view of an axial flux motor/generator machine according to the present invention which illustrates a flow diverter system forming part of the present invention.
Figure 2:
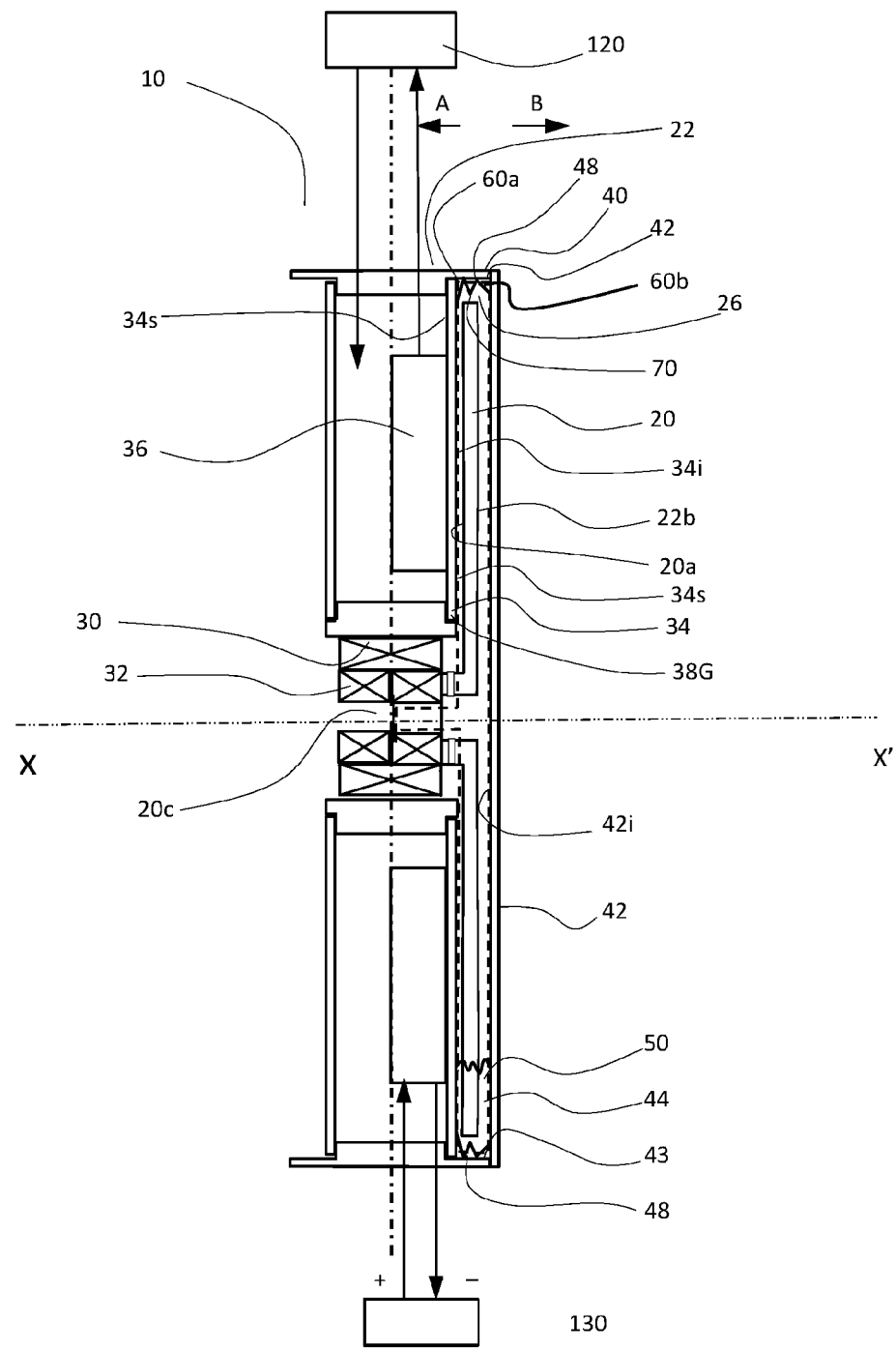
FIG. 2 is a first side cross-sectional view of the machine in FIG. 1 and illustrates in more detail the inter-relationship between the rotor and a first aspect of the cooling system associated therewith.

Referring now to the drawings in general but particularly to FIGS. 1 and 2, an axial flux machine (motor/generator) 10 comprises a rotor 20 and a stator portion 22 and a containment chamber 26 in which the rotor 20 rotates about longitudinal axis X. The stator portion 22 includes an inner aperture 30 which houses a bearing member shown generally at 32 and which supports the rotor 20 for rotation. The stator 22 includes a front wall 34 which defines a barrier between the electromagnets shown schematically at 36 and positioned on one side 34i thereof and within the stator portion 22 and a first side 20a of the rotor itself 20 which is spaced from a second side 34s of said front wall 34 such as to define a cavity 38 or gap G therebetween, best seen in FIG. 8. The containment chamber 26 is formed partially by the second side 34s of the front wall 34 and partially by a casing 40 having an inner surface 43, a bottom portion 44, a top portion 45, an axially and circumferentially extending outer portion 48 surrounding said rotor 20 and a cover plate 42 having an inner face 42i confronting and being spaced from a second side 22b of said rotor 20. The containment chamber 26 includes a sump portion 50 at the bottom thereof for receiving cooling fluid 52. The rotor 20 has a plurality of magnets 20m provided thereon and arranged in a circumferentially spaced manner therearound and includes an axially extending portion 20c which extends towards and is mounted for rotation in bearing member 32.

One or more first flow diverters 60 are provided on or in association with the outer portion 48 and may be circumferentially spaced therearound, as best seen in FIG. 1. Whilst the specific location and form of the first flow diverters 60 may vary, they preferably include one and possibly more axially extending portions 60a, 60b extending towards one and possibly both of said front wall 34 and said cover plate 42, the reasons for which will be described in detail later herein.

Figure 8:
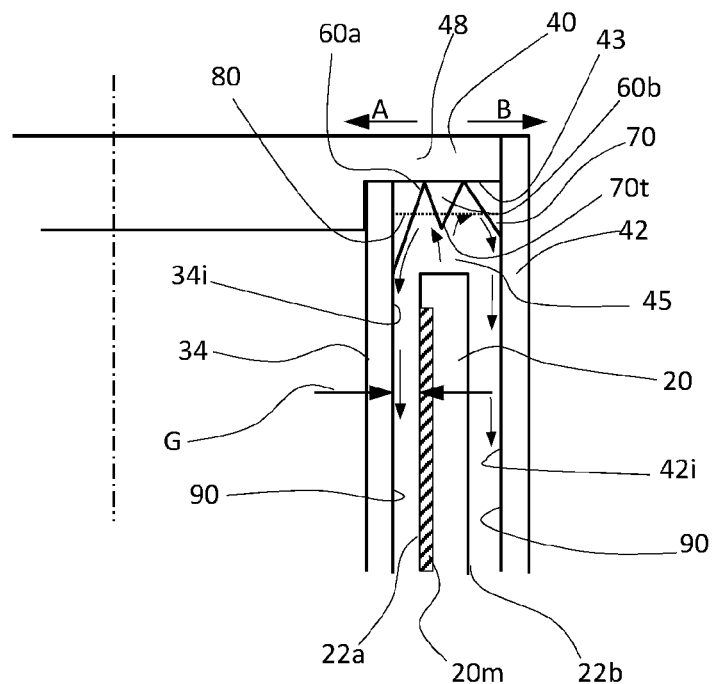
FIG. 8 is an enlarged view of a top portion of FIG. 2.

A flow splitter 70 best seen in FIGS. 2 and 8 may be provided on outer portion 48 for splitting the flow of cooling fluid to either side A, B of the containment chamber 26 as it is centrifuged off the disk. Again, whilst the specific form and location of the flow splitter may vary, it has been found that a circumferentially extending peaked arrangement having a tip 70t positioned on and extending circumferentially around outer portion 48 and being radially outwardly of a portion of the rotor 20 will act to split the flow of any centrifuged fluid such as to direct it in the directions of arrows A, B in FIG. 8. The axial position of the peak may be varied such as to cause an even or an un-even split of fluid between directions A, B and this may have advantages as will be described later herein.

One or more flow interrupters 80 may also be provided around the circumference of the outer portion 48 and preferably extend across the entire gap between the front wall 34 of the stator 22 and the cover plate 42 and acts to interrupt the flow of any fluid around the circumference and cause it to be diverted towards the front wall 34 and/or the cover plate 42 itself.

One or more flow directors 90, best seen schematically in FIG. 1 and in more detail in FIGS. 4 to 7, may be provided on inwardly facing surfaces 34i and 42i of front wall 34 and cover plate 42. The flow directors 90 are generally radially extending in the direction of arrow Ro, Ri between the outer surface 42 and inner aperture 30 and act to direct fluid received thereby back towards the bearing 32 mounted within the aperture for lubrication and cooling purposes or downwardly (Ro) towards the sump 50. The reader will appreciate that the flow directors on an upper portion of the motor 10 will direct fluid back towards the bearing 32 whilst those on a lower portion will act to direct fluid back towards the sump 50 and that fluid directed to the bearing 32 may then be directed towards the sump 50.

Reference is now made in particular to FIGS. 4 to 7 which illustrate two preferred arrangements of flow director 90, each of which provide a wicking surface able to retain fluid on the surface whilst also directing it in a preferred direction. The arrangement of FIG. 5 comprises a plurality of discrete grooves or channels 92 provided in one or other or both of inwardly facing surfaces 34i and 42i of front wall 34 and cover plate 42. The depth and width of each groove or channel 92 provides a shelter for any fluid directed onto the surfaces and a capillary reaction effect is created which preferentially directs the fluid in the desired direction of towards the bearing 32 or towards the sump 50. An alternative arrangement is shown in detail in FIG. 7 and comprises a wicking material having an open structure for receiving fluid directed thereto and a plurality of internal passageways 94 allowing fluid received therein to be channelled towards the bearing 32 or sump 50, as discussed above. Whilst a number of wicking materials are known, it is preferred that the arrangement in the present invention includes a plurality of directionally oriented internal passageways 94 within the wicking material itself which are directed towards the aperture 30 and bearing or the sump 50. Without these arrangements, fluid dissipated onto surfaces 34s and 42i may simply drain vertically downwardly towards the sump and little would find its way to the bearing which may be starved of cooling and lubrication fluid.

Figure 3:
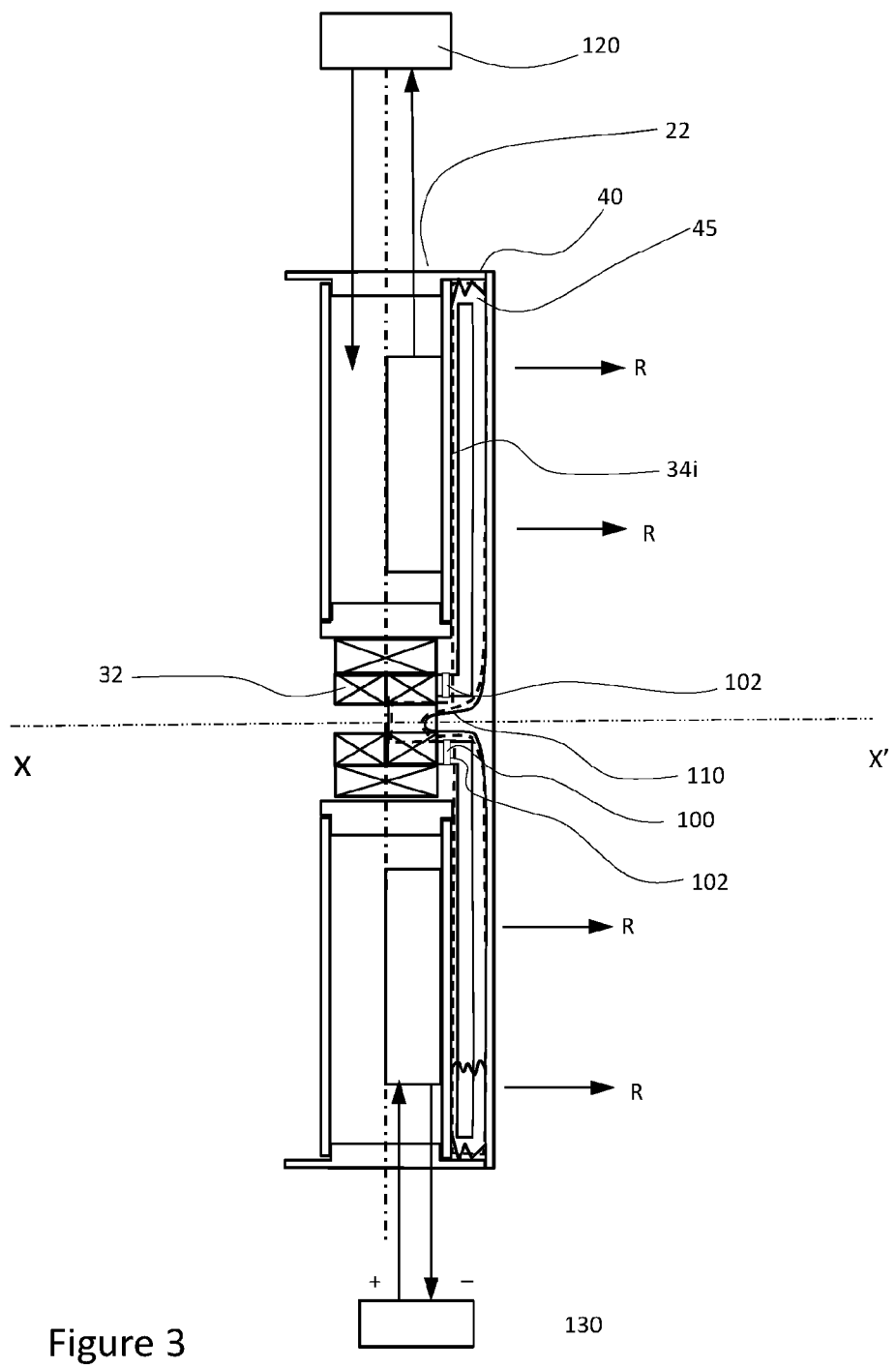
FIG. 3 is a second side cross-sectional view of the machine in FIG. 1 and illustrates in more detail the inter-relationship between the rotor and a second aspect of the cooling system associated therewith.

FIG. 3 illustrates an alternative arrangement having many components the same as shown in FIG. 2 and not, therefore, repeated here. The difference lies in the provision of additional component in the form of a second flow diverter 110 extending substantially axially along axis X from the inner surface 42i of the cover plate 42 and into a cavity 104 defined within the axially extending portion 20c. The second flow diverter 110 may be provided in addition to any one or more of the above flow components and is employed to direct fluid on the inner surface 42i axially into the cavity 104 from which it may be directed to the bearing 32 in the manner discussed in detail below with reference to FIG. 10.

Figure 9:
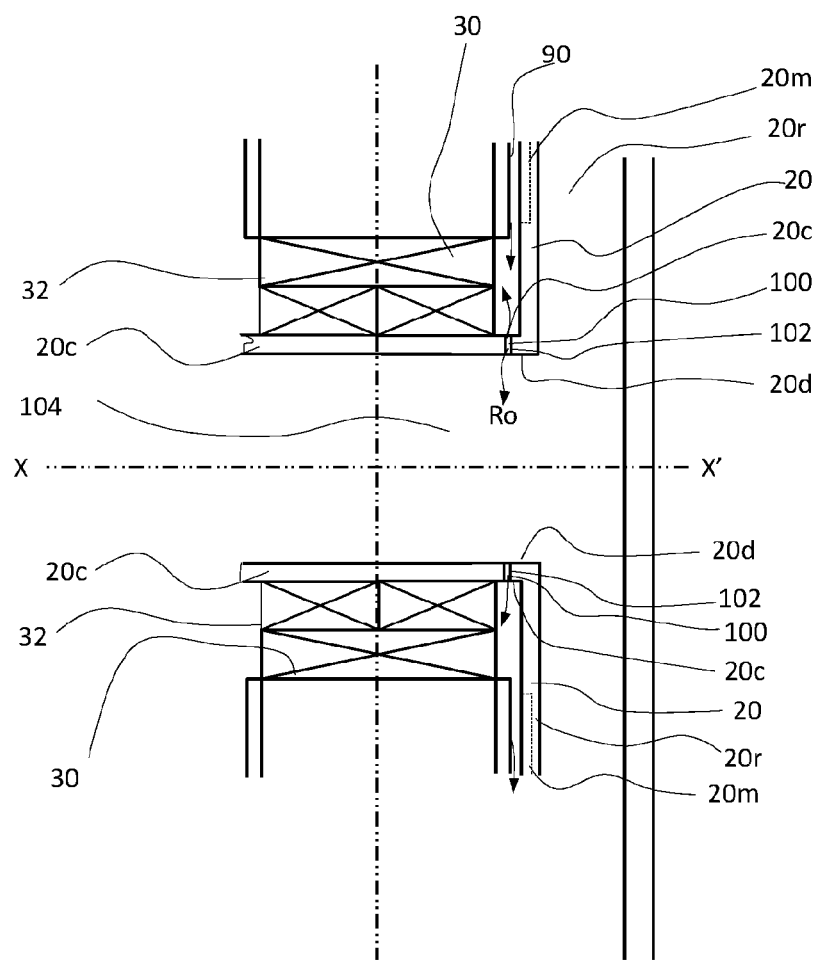
FIG. 9 is an enlarged view of a central portion of FIG. 2.
Figure 10:
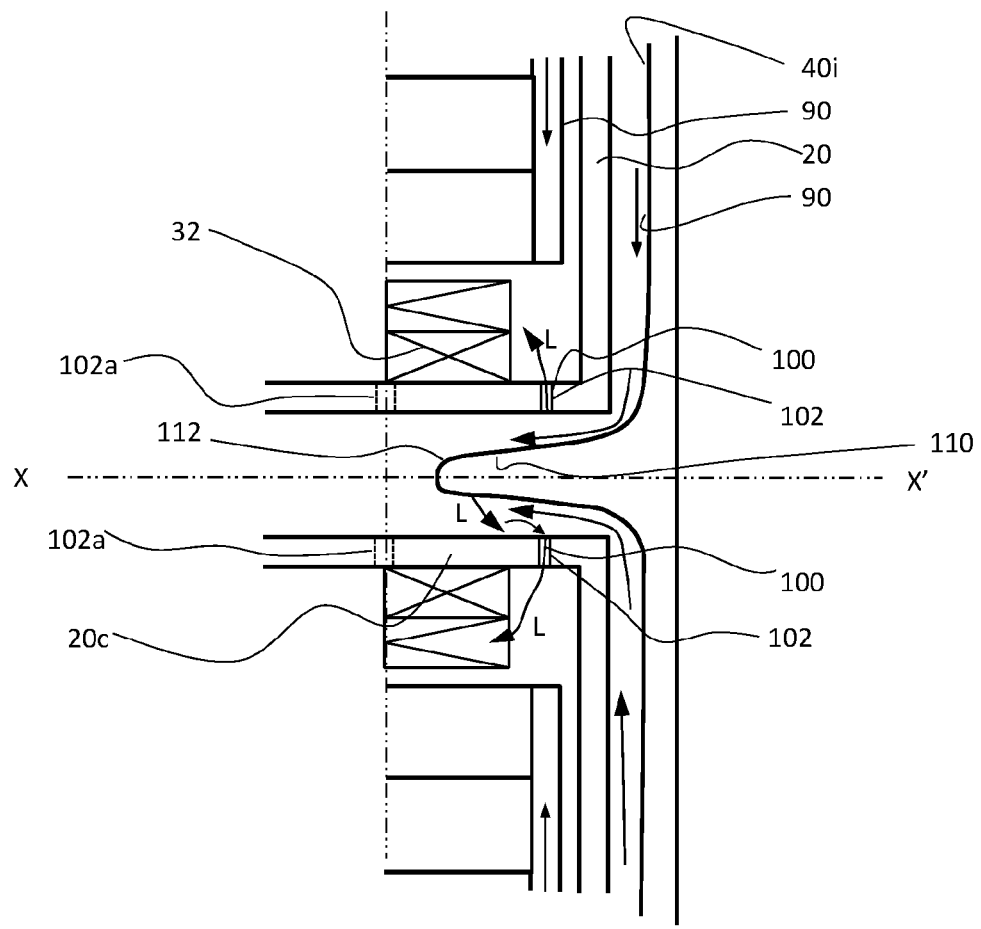
FIG. 10 is an enlarged view of a central portion of FIG. 3.

Reference is now made more particularly to FIGS. 9 and 10 which illustrate in more detail the central portions of FIGS. 2 and 3. From FIG. 9 it will be appreciated that the axially extending portion 20a of the rotor 20 may be provided with one or more secondary flow directors 100 in the form of, for example, more radially extending holes 102 extending from an outer surface 20c to an inner surface 20d at a position between the radially extending portion 20r of the rotor 20 and the bearing aperture 30. The holes are arranged such as to allow some, if not all, of any fluid entrapped within the hollow cavity 104 within axial portion 20a to be vented therefrom and, if desired, directed towards the bearing 32 as and when desired. Flow in the opposite direction referenced by arrow Fo is also possible when the rotor 20 is stationary and may be used to return fluid collected to the sump 50 for subsequent use.

Also shown in more detail in FIGS. 9 and 10 is the flow director arrangement shown at 90 which, preferably, terminates proximate the bearing aperture 30 and bearing 32. The close proximity will allow for fluid which passes downwardly or inwardly in the direction of arrow Ri to pass from the flow diverter and onto bearing 32 such as to lubricate and cool it. Whilst it will be appreciated that direct transfer of fluid to the bearing may be possible if the bearing and flow director 90 are in immediate contact with each other, one may also space the bearing 32 from the flow director 90 and employ capillary reaction or the natural tendency of a fluid to adhere to a surface such as to cause the fluid to bridge any distance between the director 90 and the bearing 32.

FIG. 10 illustrates in more detail the central portion of FIG. 3 and differs from FIG. 10 only in relation to the provision of a secondary flow diverter 110. The secondary flow diverter 110 extends axially from the inner surface 42i of cover plate 42 and into the cavity 104 formed by the hollow inner portion 104. Fluid passing down surface 42i is diverted by diverter 110 such as to cause it to enter cavity 104 at which point it will drop off and attach to an inner surface 20d of the cavity axially extending portion 20c. It will be appreciated that the inner surface 20d will be rotating and any fluid deposited thereon will be centrifuged outwardly and pass into holes 102 forming the flow diverter 100 and then to the bearing 32, as illustrated by arrows L. It will also be appreciated that any fluid within cavity 104 will drain via holes 102 when the rotor 20 is stationary. The position of holes 102 may be varied such as to optimise the distribution of fluid to the bearing. As most arrangements will employ a split inner bearing, a further hole or holes, shown dotted at 102a, may be provided in a position aligned with the split in the bearing such as to provide lubrication directly to the inner portion of the bearing. Hole or holes 102a may also be provided in replacement of hole or holes 102.

A cooling system, shown schematically at 120 in FIG. 2, may also be provided to direct cooling fluid into and out of a second chamber 122 surrounding the electromagnets 36. This cooling fluid is used to directly cool the electromagnets 36 and may also be used to indirectly cool the rotor 20 when used in cooperation with the cooling fluid within the rotor containment chamber 26, as will be described in detail below. A current supply system 130, also shown schematically in FIG. 2, is provided for supplying electrical current to the electromagnets 36 in a manner well known in the art so not described herein.

In operation, the machine 10 is started by causing electrical current to be supplied from supply 130 to electromagnetic coils 36 to create an electro-magnetic force acting on magnet portions 22m on rotor 22 such as to turn the rotor as required. The passage of the current through the coils 36 creates heat which saturates both the coils 36 and by direct and reactive losses the disk 20. Whilst the cooling system 120 is able to directly cool the coils 36, cooling of the disk 20 has been found to be somewhat more problematic and the rotational speed is normally limited by the ability to cool the overall arrangement. Whilst the air gap 38, G between the rotor 20 and the inner surface 34i is necessary to allow for free rotation of the rotor 20, it presents a significant obstacle for the passage of heat from the rotor 20 back to the stator 20 from where heat can be removed in a direct manner. The present invention aims to exploit the gap 38, G and a corresponding gap 140 between the rotor 20 and the cover plate 42 together with other features of the design to facilitate the passage of heat from the rotor 20 either to atmosphere or to the stator 22 such as to allow for the more efficient cooling thereof. In addition, the present arrangement is able to direct fluid to the bearing 36 such as to both lubricate and cool it. The cooling/lubricating fluid 52 is provided in sump 50 and rotation of the rotor 20 through the fluid causes the fluid to be picked up by the disk 20 which tends to centrifuge it outwardly such that it sprays onto the inner surface 43 of the axially and circumferentially extending portion 48 surrounding the rotor 20. As discussed above, portion 48 is provided with a number of features in the form of one or more of flow diverters 60, flow splitters 70 and flow interrupters 80 which act individually and/or in combination to cause the fluid to be transferred to one or other or both of mutually confronting surfaces 34i and/or 42i. The flow diverters 60 are provided on one or more sides of the chamber and extend between portion 48 and one or other of the surfaces 34i and/or 42i such as to cause fluid to drain there across and onto the surfaces as required. The flow splitter 70 itself is positioned radially outwardly of the rotor 20 and the axial position thereof is selected such as to split the centrifuged fluid as required between each of directions A and B of FIGS. 2 and 3. Centrifuged fluid split by splitter 70 will contact diverters 60 and flow to surfaces 34i, 42i. It will be appreciated that a portion of the fluid 52 will be caused to drain circumferentially down and around the inner surface, as shown by arrow D in FIG. 1 and, uninterrupted, will provide little contribution to the cooling effect as it will not come into contact with the rotor surface. However, if interrupters 80 are provided (best seen in FIG. 1) then fluid draining in this manner will be caused to be re-directed radially inwardly as it meets the interrupter 80, such as to cause said fluid to pass onto diverters 60 and thence surfaces 34, 42i. Such interrupters and the position thereof may be used to enhance the cooling effect or may be eliminated at certain positions if rapid draining back to sump 50 is required or desired. Fluid directed on to surface 34i will be directed across, down or through the flow directors 90 shown in detail in FIGS. 4 to 7 and discussed in detail above. The directors 90 on any upper portion of the surface 34i will act to direct fluid inwardly and towards bearing 32 such as to both cool it and lubricate it. However, it will also be appreciated that the flow of fluid over surface 34i will allow for heat to be passed across to the stator 22 from which it can be removed by the direct cooling effect of cooling system 120. Fluid directed onto surface 42i will drain theredown as described above with reference to FIG. 10 and in doing so will cause heat to be transferred across the cover plate 42 and expelled to atmosphere in the direction of arrows R in FIG. 3. This cooling effect will be additional to that provided by cooling system 120 and the surface of the cover plate 42 may be further provided with cooling from cooling system 120 if so desired. Once fluid has reached axially extending portion 110, it is caused to move axially into cavity 104 and will drip off onto the inner surface of axially extending portion 20i such as to pass through holes 102 and then to the bearings 32 in the manner discussed in detail above with reference to FIG. 10.

It has been found that operation of the indirect cooling and/or lubricating system within containment chamber 26 can reduce the operating temperature of the rotor from 100° C. to 80° C. degrees C. relative to an arrangement having just the conventional direct cooling of the magnets alone. It has also been found that bearing temperatures and operational life can be improved as fluid is supplied directly thereto rather than simply centrifuged outwardly therefrom. Still further, the extra cooling capacity provided by the addition of the indirect cooling arrangement will allow for an increase in the amount of current supplied to the coils which will allow for a greater rotational speed and torque output, thus improving still further the torque/kg and W/kg output of such machines.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly. Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims.

The invention claimed is:

1. An axial flux motor comprising:
   a rotor having a radially extending portion and an axially extending portion having a first side and a second side;
   a stator having an inner aperture, a front wall having a first side and a second side and being axially spaced from the first side of the rotor by a gap;
   a bearing member within the inner aperture of the stator and supporting the axially extending portion of the rotor;
   a casing having an axially and circumferentially extending outer portion surrounding said rotor and having an inner circumferential surface;
   a cover plate having an inner face confronting and being spaced from said second side of said rotor;
   a containment chamber including said second side of said stator and said inner face of said cover plate and having an upper portion, said containment chamber being partially filled with a volume of cooling liquid for cooling the rotor;
   a sump within the containment chamber for receiving the cooling liquid; and
   one or more first flow diverters on the inner circumferential surface of said casing to direct said cooling liquid towards said second side of said stator and/or said inner face of said cover plate,
   wherein the volume of cooling fluid is such that, when the rotor rotates, said cooling fluid in the sump is picked up by the rotor and thrown centrifugally outwardly towards said inner circumferential surface of said casing.

2. The axial flux motor as claimed in claim 1 and wherein said one or more first flow diverters comprise axially extending portions extending between said inner surface of said casing and one or other of said second side of said stator and said inner side face of said cover plate.

3. The axial flux motor as claimed in claim 2 and including one or more flow interrupters circumferentially spaced around said inner circumferential surface.

4. The axial flux motor as claimed in claim 3 wherein said flow director comprises a wicking material.

5. The axial flux motor as claimed in claim 1 and including a plurality of flow diverters and wherein said diverters are circumferentially spaced around said inner circumferential surface.

6. The axial flux motor as claimed in claim 1 and including a flow splitter radially outward of said rotor.

7. The axial flux motor as claimed in claim 6 and including one or more flow interrupters circumferentially spaced around said inner circumferential surface.

8. The axial flux motor as claimed in claim 1 and including a flow director on one or other or both of said second side of said stator and said inner face of said cover plate.

9. The axial flux motor as claimed in claim 8 and wherein said flow director comprises a plurality of grooves within the surface of one or other or both of said second side of said stator and said inner face of said cover plate.

10. The axial flux motor as claimed in claim 8 wherein said flow director extends radially inwardly towards said bearing member.

11. The axial flux motor as claimed in claim 1 and including a second flow diverter extending axially from said cover plate inner face and towards said bearing member.

12. The axial flux motor as claimed in claim 11 and wherein said rotor includes a hollow shaft portion and wherein said second flow diverter extends into said hollow shaft portion and terminates proximal to said bearing member.

13. The axial flux motor as claimed in claim 12 and wherein the axially extending portion of rotor includes an inner surface and an outer surface and further includes one or more secondary flow directors comprising radially extending passageways extending therebetween.

14. The axial flux motor as claimed in claim 1, wherein said bearing lies between said sump and said top portion of the containment chamber.

* * * * *